(12) United States Patent
Zhang et al.

(10) Patent No.: US 11,653,406 B2
(45) Date of Patent: May 16, 2023

(54) TECHNIQUES FOR RADIO LINK MONITORING AND BEAM FAILURE RECOVERY ON NON-SERVING CELL

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 213 days.

(21) Appl. No.: 17/247,523

(22) Filed: Dec. 15, 2020

(65) Prior Publication Data

US 2021/0227613 A1 Jul. 22, 2021

Related U.S. Application Data

(60) Provisional application No. 62/962,556, filed on Jan. 17, 2020.

(51) Int. Cl.
*H04W 76/19* (2018.01)
*H04W 24/08* (2009.01)
(Continued)

(52) U.S. Cl.
CPC ........... *H04W 76/19* (2018.02); *H04W 24/08* (2013.01); *H04W 72/046* (2013.01);
(Continued)

(58) Field of Classification Search
CPC ............. H04W 76/19; H04W 72/0413; H04W 74/0833; H04W 72/046; H04W 24/08;
(Continued)

(56) References Cited

U.S. PATENT DOCUMENTS

2017/0142604 A1 5/2017 Reial et al.
2019/0081688 A1* 3/2019 Deenoo ................. H04L 5/0069
(Continued)

FOREIGN PATENT DOCUMENTS

WO 2018171044 A1 9/2018

OTHER PUBLICATIONS

Ericsson: "Details on Lower-Layer Mobility Enhancements", 3GPP Draft, 3GPP TSG-RAN WG1 Meeting #96, R1-1905162, Details on Lower-Layer Mobility Enhancements, 3rd Generation Partnership Project (3GPP), Mobile Competence Centre, 650, Route Des Lucioles, F-06921 Sophia-Antipolis Cedex, Fr, vol. RAN WG1. No. Xian, China, Apr. 8, 2019-Apr. 12, 2019, Apr. 7, 2019 (Apr. 7, 2019), XP051700239, 8 Pages, Retrieved from the Internet: URL: http://www.3gpp.org/ftp/Meetings%5F3GPP%5FSYNC/RAN1/Docs/R1%2D1905162%2Ezip. [retrieved on Apr. 7, 2019].
(Continued)

*Primary Examiner* — Brian D Nguyen
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive configuration information associated with monitoring link quality on a non-serving cell of the UE, wherein the configuration information includes at least one of: information indicating a reference signal resource associated with the non-serving cell, or information indicating an uplink resource associated with the non-serving cell; monitor a reference signal of the non-serving cell based at least in part on the configuration information; and transmit, to a serving cell using the uplink resource, a channel quality indicator associated with the non-serving cell based at least in part on the monitoring. Numerous other aspects are provided.

30 Claims, 7 Drawing Sheets

(51) Int. Cl.
*H04W 72/04* (2009.01)
*H04W 72/08* (2009.01)
*H04W 74/08* (2009.01)
*H04W 72/044* (2023.01)

(52) U.S. Cl.
CPC ..... *H04W 72/0413* (2013.01); *H04W 72/085* (2013.01); *H04W 74/0833* (2013.01)

(58) Field of Classification Search
CPC ........... H04W 36/0085; H04W 72/085; H04W 16/28; H04W 48/16; H04L 5/006; H04L 5/0035; H04L 5/0094; H04L 5/0048
See application file for complete search history.

(56) References Cited

U.S. PATENT DOCUMENTS

| | | | | |
|---|---|---|---|---|
| 2019/0230545 A1* | 7/2019 | Liou | | H04W 76/19 |
| 2019/0274169 A1* | 9/2019 | Tsai | | H04W 56/003 |
| 2020/0044723 A1* | 2/2020 | Cirik | | H04B 7/0695 |
| 2020/0288359 A1* | 9/2020 | Kim | | H04W 36/026 |
| 2021/0044956 A1* | 2/2021 | Kim | | H04L 1/1812 |
| 2021/0167930 A1* | 6/2021 | Jeon | | H04L 5/0092 |
| 2022/0116802 A1* | 4/2022 | Kim | | H04W 24/08 |

OTHER PUBLICATIONS

International Search Report and Written Opinion—PCT/US2020/070915—ISA/EPO—dated Apr. 6, 2021.

Qualcomm Incorporated: "Beam Recovery Procedures", 3GPP Draft, 3GPP TSG-RAN WG1 NR#2, R1-1711161 Beam Recovery Procedures, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051300361, pp. 1-5, Retrieved from the Internet: URL: http://www.3gpp.org/ftp/Meetings_3GPP_SYNC/RAN1/Docs/, [retrieved on Jun. 26, 2017], Sections: 2, 3.

* cited by examiner

TECHNIQUES FOR RADIO LINK MONITORING AND BEAM FAILURE RECOVERY ON NON-SERVING CELL

CROSS-REFERENCE TO RELATED APPLICATION

This Patent Application claims priority to U.S. Provisional patent Application No. 62/962,556, filed on Jan. 17, 2020, entitled "TECHNIQUES FOR RADIO LINK MONITORING AND BEAM FAILURE RECOVERY ON NON-SERVING CELL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for radio link monitoring (RLM) and beam failure recovery (BFR) on a non-serving cell.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configuration information associated with monitoring link quality on a non-serving cell of the UE, wherein the configuration information includes at least one of: information indicating a reference signal resource associated with the non-serving cell, or information indicating an uplink resource associated with the non-serving cell; monitoring a reference signal of the non-serving cell based at least in part on the configuration information; and transmitting, to a serving cell using the uplink resource, a channel quality indicator associated with the non-serving cell based at least in part on the monitoring.

In some aspects, the monitoring is associated with a beam failure detection or beam failure recovery operation.

In some aspects, the monitoring is associated with a radio link monitoring operation.

In some aspects, the non-serving cell comprises at least one of a neighbor cell or a candidate cell of the UE.

In some aspects, the information indicating the reference signal resource indicates a physical cell identifier of the non-serving cell.

In some aspects, the reference signal comprises at least one of a synchronization signal block or a channel state information reference signal for cell quality monitoring or beam quality monitoring on the non-serving cell.

In some aspects, the uplink resource includes at least one of a physical uplink control channel or a random access channel resource configured in the uplink of a cell.

In some aspects, the method includes detecting a failure on the non-serving cell based at least in part on detecting that a measurement of all monitored reference signals associated with the non-serving cell fail to satisfy a threshold, wherein the channel quality indicator indicates the failure.

In some aspects, the method includes removing the non-serving cell from a set of candidate cells of the UE based at least in part on detecting the failure and based at least in part on identifying no selected beam on the non-serving cell.

In some aspects, the method includes receiving an uplink resource allocation based at least in part on the channel quality indicator indicating a failure associated with the non-serving cell; and providing information associated with the channel quality indicator or the failure associated with the non-serving cell using the resource allocation.

In some aspects, the information associated with the channel quality indicator includes a cell identifier or a physical cell identifier associated with the non-serving cell.

In some aspects, the information associated with the channel quality indicator indicates a selected cell or a selected beam on the non-serving cell with a quality value that satisfies a threshold.

In some aspects, the method includes receiving information configuring the UE to perform a monitoring operation on the selected beam on the non-serving cell.

In some aspects, the method includes adding the selected cell to a set of candidate cells of the UE.

In some aspects, a method of wireless communication, performed by a base station, may include transmitting configuration information associated with monitoring link quality on a non-serving cell of a UE, wherein the configuration information includes at least one of: information indicating a reference signal resource associated with the non-serving cell, or information indicating an uplink resource associated with the non-serving cell; and receiving, using the uplink resource, a channel quality indicator associated with the non-serving cell based at least in part on the monitoring.

In some aspects, the monitoring is associated with a beam failure detection or beam failure recovery operation.

In some aspects, the monitoring is associated with a radio link monitoring operation.

In some aspects, the non-serving cell comprises at least one of a neighbor cell or a candidate cell of the UE.

In some aspects, the information indicating the reference signal resource indicates a physical cell identifier of the non-serving cell.

In some aspects, the reference signal resource is associated with at least one of a synchronization signal block or a channel state information reference signal for cell quality monitoring or beam quality monitoring on the non-serving cell.

In some aspects, the uplink resource includes at least one of a physical uplink control channel or a random access channel resource configured in the uplink of a cell provided by the base station.

In some aspects, the channel quality indicator indicates a failure of the non-serving cell detected by the UE.

In some aspects, the method includes removing the non-serving cell from a set of candidate cells of the UE based at least in part on the failure and based at least in part on the UE identifying no selected beam on the non-serving cell.

In some aspects, the method includes transmitting an uplink resource allocation based at least in part on the channel quality indicator indicating a failure of the non-serving cell detected by the UE; and receiving information associated with the channel quality indicator using the resource allocation.

In some aspects, the information associated with the channel quality indicator includes a cell identifier or a physical cell identifier associated with the non-serving cell.

In some aspects, the information associated with the channel quality indicator indicates a selected cell or a selected beam on the non-serving cell with a quality value that satisfies a threshold.

In some aspects, the method includes transmitting information configuring the UE to perform a monitoring operation on the selected beam on the non-serving cell.

In some aspects, the method includes adding the selected cell to a set of candidate cells of the UE.

In some aspects, a UE for wireless communication may include a memory and one or more processors operatively coupled to the memory. The memory and the one or more processors may be configured to receive configuration information associated with monitoring link quality on a non-serving cell of the UE, wherein the configuration information includes at least one of: information indicating a reference signal resource associated with the non-serving cell, or information indicating an uplink resource associated with the non-serving cell; monitor a reference signal of the non-serving cell based at least in part on the configuration information; and transmit, to a serving cell using the uplink resource, a channel quality indicator associated with the non-serving cell based at least in part on the monitoring.

In some aspects, the monitoring is associated with a beam failure detection or beam failure recovery operation.

In some aspects, the monitoring is associated with a radio link monitoring operation.

In some aspects, the non-serving cell comprises at least one of a neighbor cell or a candidate cell of the UE.

In some aspects, the information indicating the reference signal resource indicates a physical cell identifier of the non-serving cell.

In some aspects, the reference signal comprises at least one of a synchronization signal block or a channel state information reference signal for cell quality monitoring or beam quality monitoring on the non-serving cell.

In some aspects, the uplink resource includes at least one of a physical uplink control channel or a random access channel resource configured in the uplink of a cell.

In some aspects, the method includes detecting a failure on the non-serving cell based at least in part on detecting that a measurement of all monitored reference signals associated with the non-serving cell fail to satisfy a threshold, wherein the channel quality indicator indicates the failure.

In some aspects, the method includes removing the non-serving cell from a set of candidate cells of the UE based at least in part on detecting the failure and based at least in part on identifying no selected beam on the non-serving cell.

In some aspects, the UE is configured to receive an uplink resource allocation based at least in part on the channel quality indicator indicating a failure associated with the non-serving cell; and provide information associated with the channel quality indicator or the failure associated with the non-serving cell using the resource allocation.

In some aspects, the information associated with the channel quality indicator includes a cell identifier or a physical cell identifier associated with the non-serving cell.

In some aspects, the information associated with the channel quality indicator indicates a selected cell or a selected beam on the non-serving cell with a quality value that satisfies a threshold.

In some aspects, the UE is configured to receive information configuring the UE to perform a monitoring operation on the selected beam on the non-serving cell.

In some aspects, the UE is configured to add the selected cell to a set of candidate cells of the UE.

In some aspects, a base station for wireless communication may include a memory and one or more processors operatively coupled to the memory. The memory and the one or more processors may be configured to transmit configuration information associated with monitoring link quality on a non-serving cell of a UE, wherein the configuration information includes at least one of: information indicating a reference signal resource associated with the non-serving cell, or information indicating an uplink resource associated with the non-serving cell; and receive, using the uplink resource, a channel quality indicator associated with the non-serving cell based at least in part on the monitoring.

In some aspects, the monitoring is associated with a beam failure detection or beam failure recovery operation.

In some aspects, the monitoring is associated with a radio link monitoring operation.

In some aspects, the non-serving cell comprises at least one of a neighbor cell or a candidate cell of the UE.

In some aspects, the information indicating the reference signal resource indicates a physical cell identifier of the non-serving cell.

In some aspects, the reference signal resource is associated with at least one of a synchronization signal block or a channel state information reference signal for cell quality monitoring or beam quality monitoring on the non-serving cell.

In some aspects, the uplink resource includes at least one of a physical uplink control channel or a random access channel resource configured in the uplink of a cell provided by the base station.

In some aspects, the channel quality indicator indicates a failure of the non-serving cell detected by the UE.

In some aspects, the base station is configured to remove the non-serving cell from a set of candidate cells of the UE based at least in part on the failure and based at least in part on the UE identifying no selected beam on the non-serving cell.

In some aspects, the base station is configured to transmit an uplink resource allocation based at least in part on the channel quality indicator indicating a failure of the non-serving cell detected by the UE; and receive information associated with the channel quality indicator using the resource allocation.

In some aspects, the information associated with the channel quality indicator includes a cell identifier or a physical cell identifier associated with the non-serving cell.

In some aspects, the information associated with the channel quality indicator indicates a selected cell or a selected beam on the non-serving cell with a quality value that satisfies a threshold.

In some aspects, the base station is configured to transmit information configuring the UE to perform a monitoring operation on the selected beam on the non-serving cell.

In some aspects, the base station is configured to adding the selected cell to a set of candidate cells of the UE.

In some aspects, a non-transitory computer-readable medium may store one or more instructions for wireless communication. The one or more instructions, when executed by one or more processors of a UE, may cause the one or more processors to receive configuration information associated with monitoring link quality on a non-serving cell of the UE, wherein the configuration information includes at least one of: information indicating a reference signal resource associated with the non-serving cell, or information indicating an uplink resource associated with the non-serving cell; monitor a reference signal of the non-serving cell based at least in part on the configuration information; and transmit, to a serving cell using the uplink resource, a channel quality indicator associated with the non-serving cell based at least in part on the monitoring.

In some aspects, the monitoring is associated with a beam failure detection or beam failure recovery operation.

In some aspects, the monitoring is associated with a radio link monitoring operation.

In some aspects, the non-serving cell comprises at least one of a neighbor cell or a candidate cell of the UE.

In some aspects, the information indicating the reference signal resource indicates a physical cell identifier of the non-serving cell.

In some aspects, the reference signal comprises at least one of a synchronization signal block or a channel state information reference signal for cell quality monitoring or beam quality monitoring on the non-serving cell.

In some aspects, the uplink resource includes at least one of a physical uplink control channel or a random access channel resource configured in the uplink of a cell.

In some aspects, the one or more instructions cause the one or more processors to detect a failure on the non-serving cell based at least in part on detecting that a measurement of all monitored reference signals associated with the non-serving cell fail to satisfy a threshold, wherein the channel quality indicator indicates the failure.

In some aspects, the one or more instructions cause the one or more processors to remove the non-serving cell from a set of candidate cells of the UE based at least in part on detecting the failure and based at least in part on identifying no selected beam on the non-serving cell.

In some aspects, the one or more instructions cause the one or more processors to receive an uplink resource allocation based at least in part on the channel quality indicator indicating a failure associated with the non-serving cell; and provide information associated with the channel quality indicator or the failure associated with the non-serving cell using the resource allocation.

In some aspects, the information associated with the channel quality indicator includes a cell identifier or a physical cell identifier associated with the non-serving cell.

In some aspects, the information associated with the channel quality indicator indicates a selected cell or a selected beam on the non-serving cell with a quality value that satisfies a threshold.

In some aspects, the one or more instructions cause the one or more processors to receive information configuring the UE to perform a monitoring operation on the selected beam on the non-serving cell.

In some aspects, the one or more instructions cause the one or more processors to add the selected cell to a set of candidate cells of the UE.

In some aspects, a non-transitory computer-readable medium may store one or more instructions for wireless communication. The one or more instructions, when executed by one or more processors of a base station, may cause the one or more processors to transmit configuration information associated with monitoring link quality on a non-serving cell of a UE, wherein the configuration information includes at least one of: information indicating a reference signal resource associated with the non-serving cell, or information indicating an uplink resource associated with the non-serving cell; and receive, using the uplink resource, a channel quality indicator associated with the non-serving cell based at least in part on the monitoring.

In some aspects, the monitoring is associated with a beam failure detection or beam failure recovery operation.

In some aspects, the monitoring is associated with a radio link monitoring operation.

In some aspects, the non-serving cell comprises at least one of a neighbor cell or a candidate cell of the UE.

In some aspects, the information indicating the reference signal resource indicates a physical cell identifier of the non-serving cell.

In some aspects, the reference signal resource is associated with at least one of a synchronization signal block or a channel state information reference signal for cell quality monitoring or beam quality monitoring on the non-serving cell.

In some aspects, the uplink resource includes at least one of a physical uplink control channel or a random access channel resource configured in the uplink of a cell provided by the base station.

In some aspects, the channel quality indicator indicates a failure of the non-serving cell detected by the UE.

In some aspects, the one or more instructions cause the one or more processors to remove the non-serving cell from a set of candidate cells of the UE based at least in part on the failure and based at least in part on the UE identifying no selected beam on the non-serving cell.

In some aspects, the one or more instructions cause the one or more processors to transmit an uplink resource allocation based at least in part on the channel quality indicator indicating a failure of the non-serving cell detected by the UE; and receive information associated with the channel quality indicator using the resource allocation.

In some aspects, the information associated with the channel quality indicator includes a cell identifier or a physical cell identifier associated with the non-serving cell.

In some aspects, the information associated with the channel quality indicator indicates a selected cell or a selected beam on the non-serving cell with a quality value that satisfies a threshold.

In some aspects, the one or more instructions cause the one or more processors to transmit information configuring the UE to perform a monitoring operation on the selected beam on the non-serving cell.

In some aspects, the one or more instructions cause the one or more processors to add the selected cell to a set of candidate cells of the UE.

In some aspects, an apparatus for wireless communication may include means for receiving configuration information associated with monitoring link quality on a non-serving cell of the apparatus, wherein the configuration information includes at least one of: information indicating a reference signal resource associated with the non-serving cell, or information indicating an uplink resource associated with the non-serving cell; means for monitoring a reference signal of the non-serving cell based at least in part on the configuration information; and means for transmitting, to a serving cell using the uplink resource, a channel quality indicator associated with the non-serving cell based at least in part on the monitoring.

In some aspects, the monitoring is associated with a beam failure detection or beam failure recovery operation.

In some aspects, the monitoring is associated with a radio link monitoring operation.

In some aspects, the non-serving cell comprises at least one of a neighbor cell or a candidate cell of the UE.

In some aspects, the information indicating the reference signal resource indicates a physical cell identifier of the non-serving cell.

In some aspects, the reference signal comprises at least one of a synchronization signal block or a channel state information reference signal for cell quality monitoring or beam quality monitoring on the non-serving cell.

In some aspects, the uplink resource includes at least one of a physical uplink control channel or a random access channel resource configured in the uplink of a cell.

In some aspects, the apparatus includes means for detecting a failure on the non-serving cell based at least in part on detecting that a measurement of all monitored reference signals associated with the non-serving cell fail to satisfy a threshold, wherein the channel quality indicator indicates the failure.

In some aspects, the apparatus includes means for removing the non-serving cell from a set of candidate cells of the UE based at least in part on detecting the failure and based at least in part on identifying no selected beam on the non-serving cell.

In some aspects, the apparatus includes means for receiving an uplink resource allocation based at least in part on the channel quality indicator indicating a failure associated with the non-serving cell; and means for providing information associated with the channel quality indicator or the failure associated with the non-serving cell using the resource allocation.

In some aspects, the information associated with the channel quality indicator includes a cell identifier or a physical cell identifier associated with the non-serving cell.

In some aspects, the information associated with the channel quality indicator indicates a selected cell or a selected beam on the non-serving cell with a quality value that satisfies a threshold.

In some aspects, the apparatus includes means for receiving information configuring the UE to perform a monitoring operation on the selected beam on the non-serving cell.

In some aspects, the apparatus includes means for adding the selected cell to a set of candidate cells of the UE.

In some aspects, an apparatus for wireless communication may include means for transmitting configuration information associated with monitoring link quality on a non-serving cell of a UE, wherein the configuration information includes at least one of: information indicating a reference signal resource associated with the non-serving cell, or information indicating an uplink resource associated with the non-serving cell; and means for receiving, using the uplink resource, a channel quality indicator associated with the non-serving cell based at least in part on the monitoring.

In some aspects, the monitoring is associated with a beam failure detection or beam failure recovery operation.

In some aspects, the monitoring is associated with a radio link monitoring operation.

In some aspects, the non-serving cell comprises at least one of a neighbor cell or a candidate cell of the UE.

In some aspects, the information indicating the reference signal resource indicates a physical cell identifier of the non-serving cell.

In some aspects, the reference signal resource is associated with at least one of a synchronization signal block or a channel state information reference signal for cell quality monitoring or beam quality monitoring on the non-serving cell.

In some aspects, the uplink resource includes at least one of a physical uplink control channel or a random access channel resource configured in the uplink of a cell provided by the base station.

In some aspects, the channel quality indicator indicates a failure of the non-serving cell detected by the UE.

In some aspects, the apparatus includes means for removing the non-serving cell from a set of candidate cells of the UE based at least in part on the failure and based at least in part on the UE identifying no selected beam on the non-serving cell.

In some aspects, the apparatus includes means for transmitting an uplink resource allocation based at least in part on the channel quality indicator indicating a failure of the non-serving cell detected by the UE; and means for receiving information associated with the channel quality indicator using the resource allocation.

In some aspects, the information associated with the channel quality indicator includes a cell identifier or a physical cell identifier associated with the non-serving cell.

In some aspects, the information associated with the channel quality indicator indicates a selected cell or a selected beam on the non-serving cell with a quality value that satisfies a threshold.

In some aspects, the apparatus includes means for transmitting information configuring the UE to perform a monitoring operation on the selected beam on the non-serving cell.

In some aspects, the apparatus includes means for adding the selected cell to a set of candidate cells of the UE.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
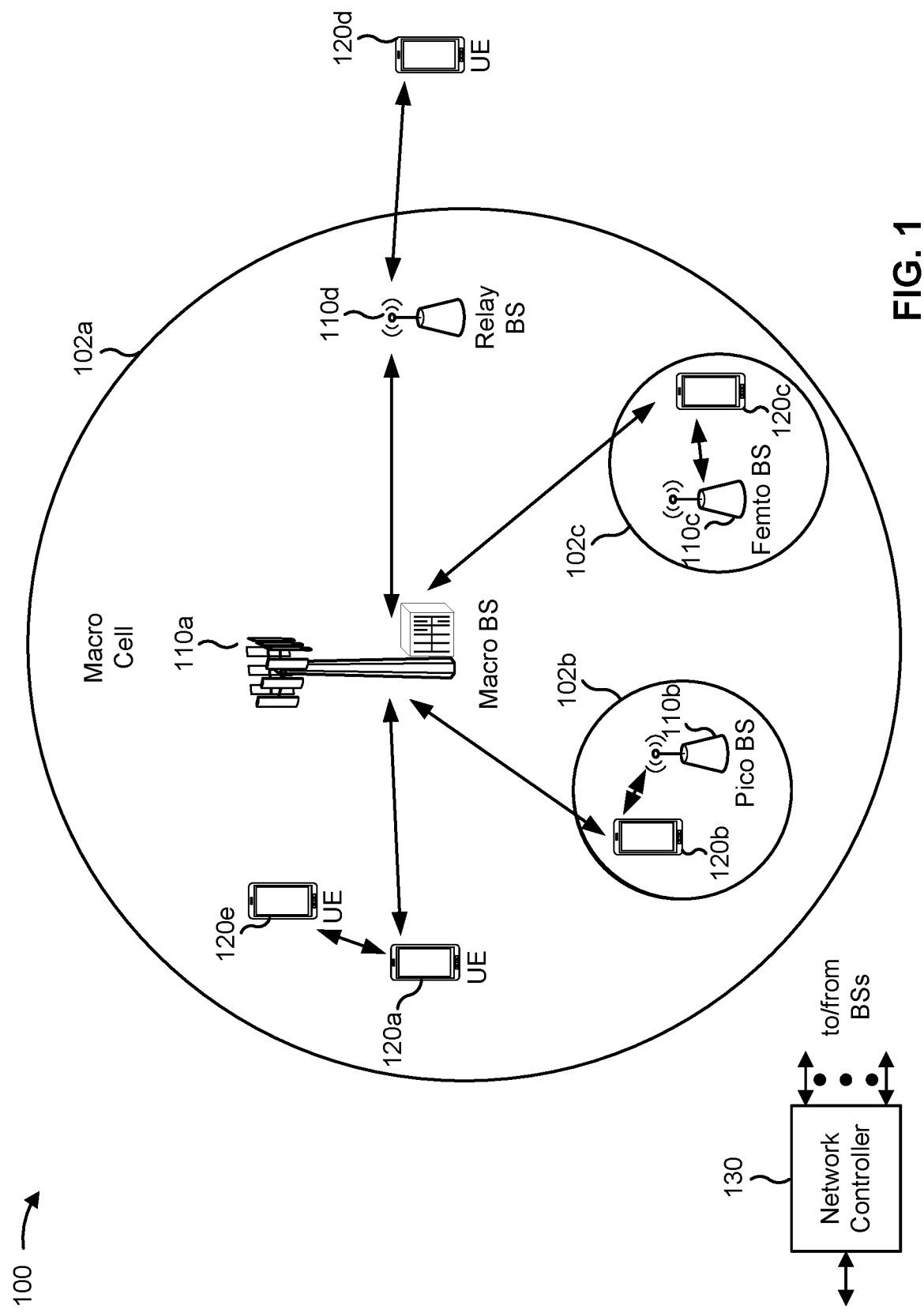
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
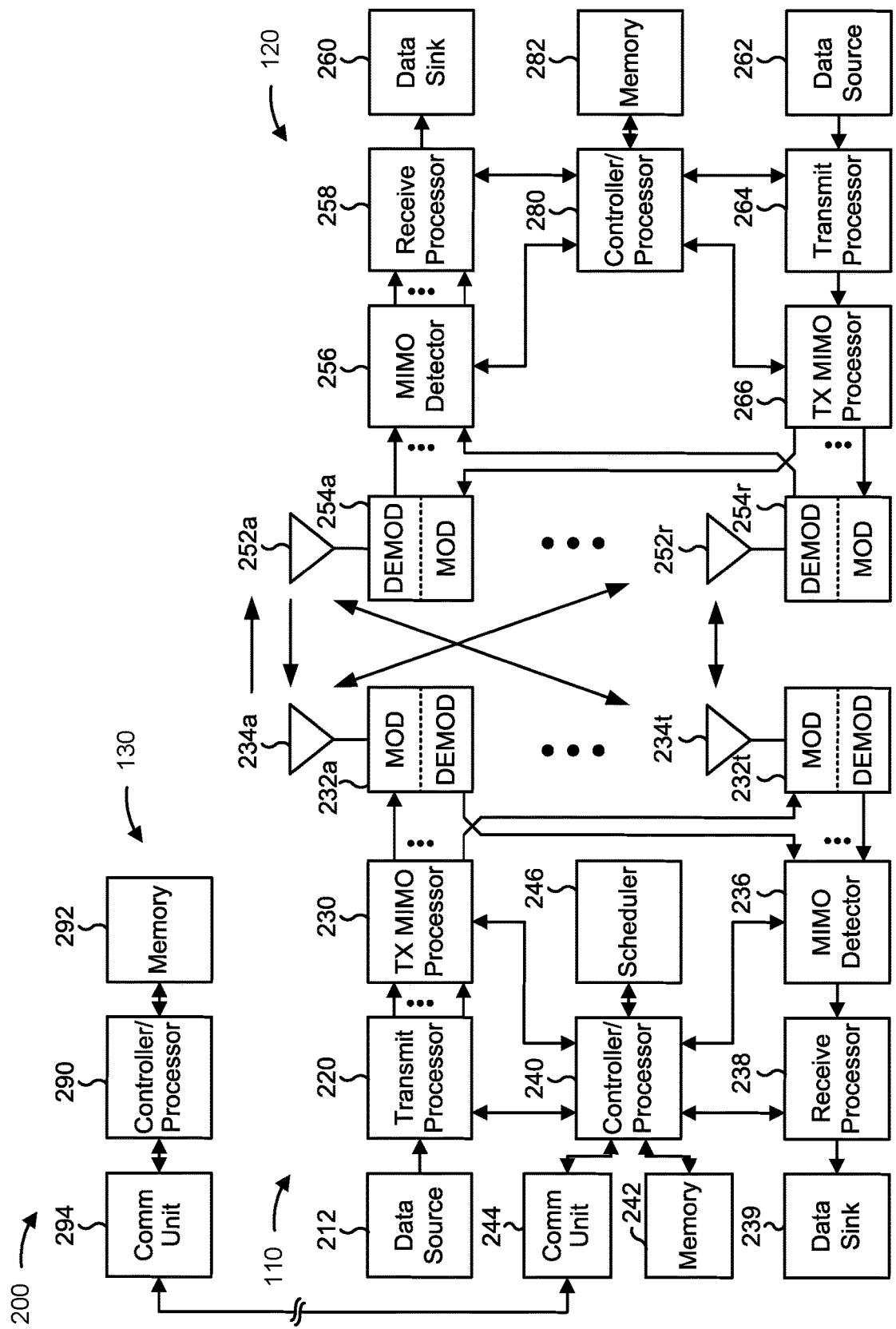
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with RLM and BFR on a non-serving cell, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving configuration information associated with monitoring link quality on a non-serving cell of the UE; means for monitoring a reference signal of the non-serving cell based at least in part on the configuration information; means for transmitting, to a serving cell using the uplink resource, a channel quality indicator associated with the non-serving cell based at least in part on the monitoring; means for detecting a failure on the non-serving cell based at least in part on detecting that all monitored reference signals associated with the non-serving cell fail to satisfy a threshold, wherein the channel quality indicator indicates the failure; means for removing the non-serving cell from a set of candidate cells of the UE based at least in part on detecting the failure and based at least in part on identifying no selected beam on the non-serving cell; means for receiving an uplink resource allocation based at least in part on the channel quality indicator indicating a failure associated with the non-serving cell; means for providing information associated with the channel quality indicator or the failure associated with the non-serving cell using the resource allocation; means for receiving information configuring the UE to perform a monitoring operation on the selected beam on the non-serving cell; means for adding the selected cell to a set of candidate cells of the UE; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting configuration information associated with monitoring link quality on a non-serving cell of a UE; means for receiving, using the uplink resource, a channel quality indicator associated with the non-serving cell based at least in part on the monitoring; means for removing the non-serving cell from a set of candidate cells of the UE based at least in part on the failure and based at least in part on the UE identifying no selected beam on the non-serving cell; means for transmitting an uplink resource allocation based at least in part on the channel quality indicator indicating a failure of the non-serving cell detected by the UE; means for receiving information associated with the channel quality indicator using the resource allocation; means for transmitting information configuring the UE to perform a monitoring operation on the selected beam on the non-serving cell; means for adding the selected cell to a set of candidate cells of the UE; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may perform various monitoring or recovery operations in order to monitor or improve link quality. For example, in some wireless systems, such as a millimeter wave (mmW) system, beam blockage (e.g., caused by a hand, a body, an object, and/or the like) is a significant concern. In some systems, when a beam of a serving cell is blocked, a beam failure recovery (BFR) procedure can be initiated based at least in part on a beam failure detection (BFD). The end-goal of the BFR procedure is to switch to an alternate beam pair on the link or eventually terminate the link. As another example, radio link monitoring (RLM) is used to track a radio link condition so that appropriate steps can be taken if radio link failure (RLF) is identified. For example, based at least in part on detecting RLF, the UE may switch from a link on a serving cell associated with the RLF to a link on another (non-serving) cell so that the other cell can be used as the serving cell.

In some cases, a UE may be associated with one or more non-serving cells, such as one or more candidate cells or one or more neighbor cells. A candidate cell may be a cell that can be selected as a serving cell of the UE. A serving cell can include a primary cell (e.g., a cell, operating on a primary frequency, in which the UE either performs an initial connection establishment procedure or initiates a connection re-establishment procedure, or a cell indicated as the primary cell in the handover procedure) and/or a secondary cell (e.g., a cell, operating on a secondary frequency, which may be configured once a connection is established and which may be used to provide additional radio resources). The candidate cell may be selected from the one or more neighbor cells. For example, a base station or the UE may determine a set of candidate cells and may select one or more serving cells from the set of candidate cells. However, some UEs may be associated with high mobility or frequently changing channel conditions. For such UEs, a cell previously selected as a candidate cell may subsequently become unsuitable as a serving cell due to high mobility or frequently changing channel conditions. In such a case, if the candidate cell is added as a serving cell of the UE, the candidate cell may fail, thereby negatively impacting UE performance, wasting computing resources of the UE and a corresponding base station, and reducing throughput.

Some techniques and apparatuses described herein provide RLM and/or BFD/BFR on a non-serving cell, such as a candidate cell. For example, the UE may be configured with reference signal resources for monitoring the non-serving cell and uplink resources to facilitate indication of beam failure or RLF on the non-serving cell. A base station may receive the indication of the beam failure or RLF, and may provide an uplink resource allocation for the UE to report more detailed information about the beam failure or RLF. Furthermore, the base station and the UE may drop the non-serving cell from a set of candidate cells or neighbor cells, may add another cell as a candidate cell, or may configure the UE to monitor another beam on the non-serving cell. In this way, computing resources of the UE and the base station are conserved that would otherwise be used to activate an unsuitable non-serving cell, throughput is improved, and UE performance is improved. Furthermore, by performing RLM and/or BFD on a non-serving cell such as a neighbor cell, techniques and apparatuses described herein facilitate more efficient (e.g., lower latency and overhead) beam management to support higher intra-cell mobility and L1/L2-centric inter-cell mobility. Such enhancements may be particularly useful for inter-cell mobility associated with non-standalone (NSA) deployments, standalone (SA) deployments, intra-band carrier aggregation deployments, intra-radio access technology deployments, and intra-frequency handover scenarios, though these enhancements are also beneficial for, and can be used for, other uses cases.

Figure 3:
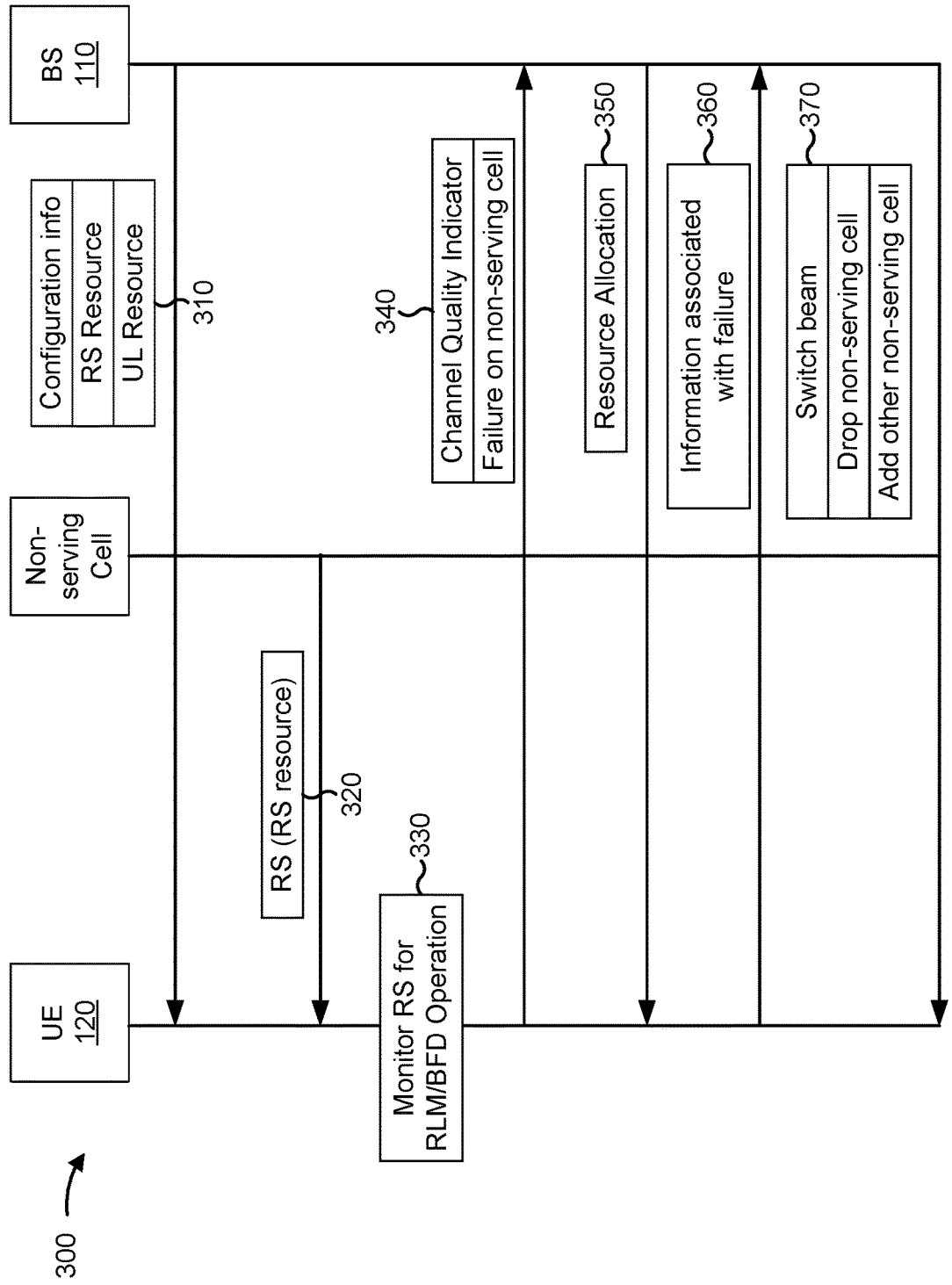
FIG. 3 is a diagram illustrating an example of RLM or BFR on a non-serving cell, in accordance with various aspects of the present disclosure.

FIG. 3 is a diagram illustrating an example 300 of RLM or BFR on a non-serving cell, in accordance with various aspects of the present disclosure. As shown, example 300 includes a UE 120, a BS 110, and a non-serving cell. The non-serving cell may be provided by the BS 110 or may be provided by another BS not shown in FIG. 3.

As shown in FIG. 3, and by reference number 310, the BS 110 may provide, to the UE 120, configuration information associated with monitoring link quality on the non-serving cell. As shown, in some aspects, the configuration information may include information indicating a reference signal (RS) resource associated with the non-serving cell. As shown, in some aspects, the configuration information may include information indicating an uplink (UL) resource associated with the non-serving cell. The RS resource may indicate a resource on which an RS (e.g., a synchronization signal block (SSB), a channel state information reference signal (CSI-RS), and/or the like) of the non-serving cell is to be received by the UE 120. The information indicating the UL resource may indicate a resource associated with the BS 110 on which the UE 120 is to transmit a channel quality indicator regarding the non-serving cell.

In some aspects, the configuration information may identify one or more non-serving cells using identifiers of the one or more non-serving cells, such as physical cell identifiers (PCIs) associated with the one or more non-serving cells. The configuration information may configure RS resources corresponding to each PCI for the UE 120 to monitor the cell quality and/or beam quality of the one or more non-serving cells.

In some aspects, respective UL resources may be configured for a set of non-serving cells. The respective UL resources may be used by the UE 120 to indicate beam failure or radio link failure of the non-serving cell, as described below. In some aspects, the UL resource may include a physical uplink control channel and/or a random access channel (RACH) resource configured in the uplink of a cell of the BS 110, such as a secondary primary cell or special cell (SPCell) and/or the like.

As shown by reference number 320, the UE 120 may receive an RS from the non-serving cell on the RS resource indicated by the configuration information. For example, the UE 120 may receive one or more SSBs, one or more CSI-RSs, and/or the like. As shown by reference number 330, the UE 120 may monitor the RS in association with a monitoring operation, such as an RLM operation, a BFD operation, and/or the like. For example, the UE 120 may monitor cell quality (e.g., beam quality) using the RS. In some aspects, the UE 120 may detect a failure based at least in part on the RS. For example, the UE 120 may detect the failure based at least in part on a measurement (e.g., a quality measurement and/or the like) for one or more RSs (e.g., all RSs, all monitored RSs, and/or the like) of the non-serving cell failing to satisfy a threshold.

As shown by reference number 340, the UE 120 may provide a channel quality indicator regarding the non-serving cell. The channel quality indicator may indicate information associated with monitoring the non-serving cell. Here, the channel quality indicator indicates a failure associated with the non-serving cell. For example, the UE 120 may provide the indication of the failure based at least in part on detecting a failure associated with the non-serving cell (e.g., based at least in part on the measurement for the one or more RSs of the non-serving cell failing to satisfy the threshold). In some aspects, the UE 120 may provide a channel quality indicator indicating that no failure has occurred. In some aspects, the UE 120 may provide no channel quality indicator, based at least in part on determining that no failure has occurred. In some aspects, the channel quality indicator may include a physical uplink control channel, a RACH message, and/or the like.

As shown by reference number 350, the BS 110 may provide an uplink resource allocation for the UE 120 based at least in part on the channel quality indicator. For example, the BS 110 may provide the resource allocation based at least in part on the failure associated with the non-serving cell. By providing the resource allocation after the failure is detected, network resources are conserved that would otherwise be used to schedule the resource allocation irrespective of whether a failure is detected. As shown by reference number 360, the UE 120 may provide information associated with the failure to the BS 110. For example, the UE 120 may provide this information using the resource allocation provided by the BS 110. In some aspects, the information associated with the failure may indicate a cell identifier or a PCI associated with the non-serving cell. In some aspects, the information associated with the failure may indicate one or more selected beams or one or more selected cells. For example, the one or more selected beams and/or the one or more selected cells may be selected by the UE 120 as an alternative to the non-serving cell or the beam of the non-serving cell that experienced the failure.

As shown by reference number 370, the BS 110 and/or the UE 120 may perform one or more actions based at least in part on the failure on the non-serving cell and/or the information associated with the failure. In some aspects, the BS 110 may configure the UE 120 to monitor the one or more selected beams and/or the one or more selected cells (e.g., to perform RLM or BFD on the one or more selected beams and/or the one or more selected cells). In some aspects, the BS 110 may perform a BFR operation. In some aspects, the BS 110 may configure the one or more selected cells as one or more serving cells of the UE 120. In some aspects, the BS 110 may remove the non-serving cell associated with the failure from a set of candidate cells or a set of neighbor cells of the UE 120. In some aspects, the BS 110 may add the one or more selected cells as one or more candidate cells of the UE 120.

By performing RLM and/or BFD on the non-serving cell, computing resources of the UE 120 and the BS 110 are conserved that would otherwise be used to activate an unsuitable non-serving cell, throughput is improved, and UE performance is improved, which may be particularly useful for Layer 1 or Layer 2 centric inter-cell mobility.

As indicated above, FIG. 3 is provided as an example. Other examples may differ from what is described with respect to FIG. 3.

Figure 4:
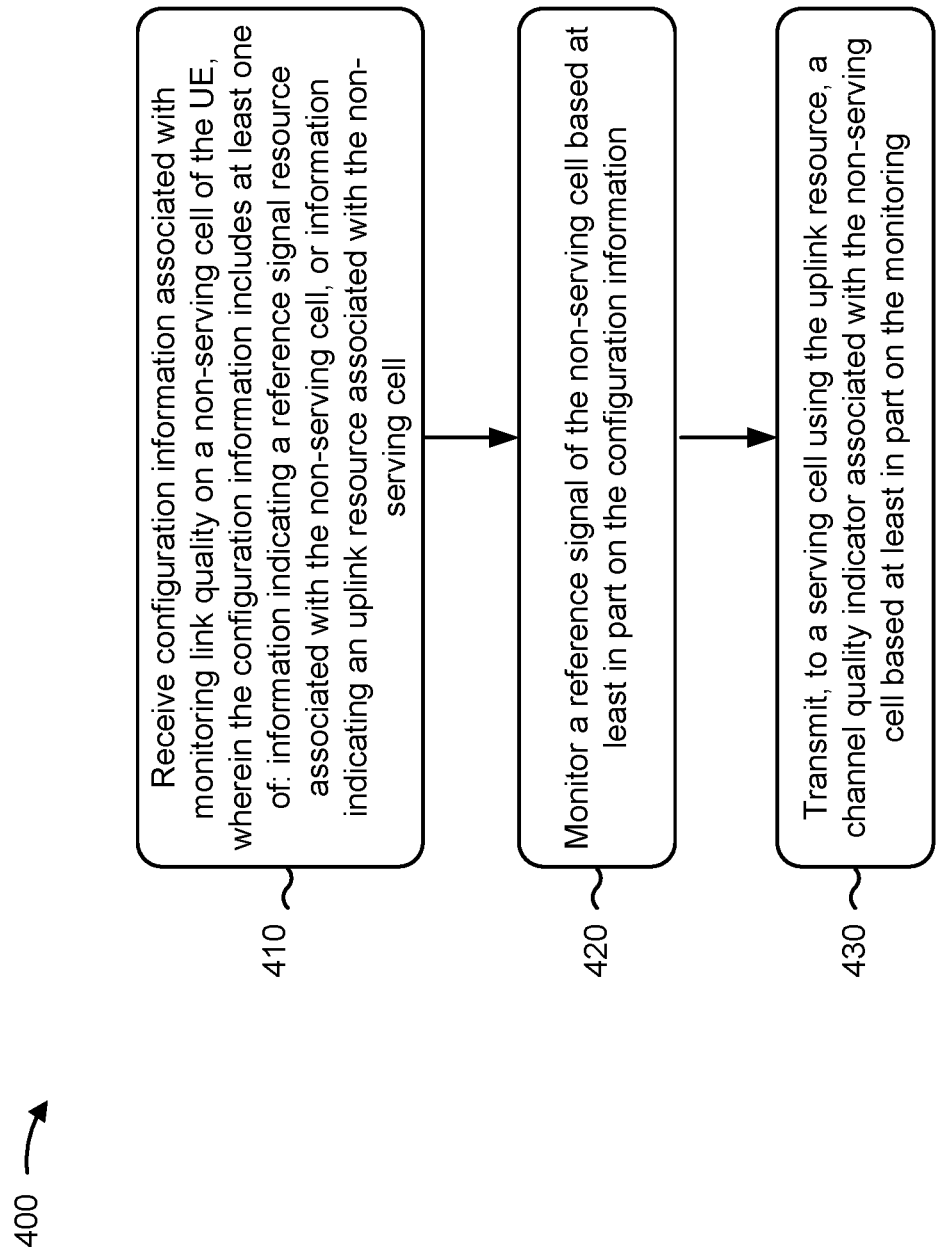
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with radio link monitoring and beam failure recovery on a non-serving cell.

As shown in FIG. 4, in some aspects, process 400 may include receiving configuration information associated with monitoring link quality on a non-serving cell of the UE, wherein the configuration information includes at least one of: information indicating a reference signal resource associated with the non-serving cell, or information indicating an uplink resource associated with the non-serving cell (block 410). For example, the UE (e.g., using antenna 252, DEMOD 254, MIMO detector 256, receive processor 258, controller/processor 280, and/or the like) may receive configuration information associated with monitoring link quality on a non-serving cell of the UE, as described above. In some aspects, the configuration information includes at least one of information indicating a reference signal resource associated with the non-serving cell, or information indicating an uplink resource associated with the non-serving cell. It should be understood that "configuration information associated with monitoring link quality" does not imply that the UE has a link (e.g., a radio resource control connection) with the non-serving cell. The techniques and apparatuses described herein can be applied for cells with which the UE does not have an active link, such as non-serving cells.

As further shown in FIG. 4, in some aspects, process 400 may include monitoring a reference signal of the non-serving cell based at least in part on the configuration information (block 420). For example, the UE (e.g., using antenna 252, DEMOD 254, MIMO detector 256, receive processor 258, controller/processor 280, and/or the like) may monitor a reference signal of the non-serving cell based at least in part on the configuration information, as described above.

As further shown in FIG. 4, in some aspects, process 400 may include transmitting, to a serving cell using the uplink resource, a channel quality indicator associated with the non-serving cell based at least in part on the monitoring (block 430). For example, the UE (e.g., using controller/processor 280, transmit processor 264, TX MIMO processor 266, MOD 254, antenna 252, and/or the like) may transmit, to a serving cell using the uplink resource, a channel quality indicator associated with the non-serving cell based at least in part on the monitoring, as described above.

Process 400 may include additional aspects, such as any single aspect or any combination of aspects described below and/or in connection with one or more other processes described elsewhere herein.

In a first aspect, the monitoring is associated with a beam failure detection or beam failure recovery operation.

In a second aspect, alone or in combination with the first aspect, the monitoring is associated with a radio link monitoring operation.

In a third aspect, alone or in combination with one or more of the first and second aspects, the non-serving cell comprises at least one of a neighbor cell or a candidate cell of the UE.

In a fourth aspect, alone or in combination with one or more of the first through third aspects, the information indicating the reference signal resource indicates a physical cell identifier of the non-serving cell.

In a fifth aspect, alone or in combination with one or more of the first through fourth aspects, the reference signal comprises at least one of a synchronization signal block or a channel state information reference signal for cell quality monitoring or beam quality monitoring on the non-serving cell.

In a sixth aspect, alone or in combination with one or more of the first through fifth aspects, the uplink resource includes at least one of a physical uplink control channel or a random access channel resource configured in the uplink of a cell.

In a seventh aspect, alone or in combination with one or more of the first through sixth aspects, process 400 includes detecting a failure on the non-serving cell based at least in part on detecting that a measurement of all monitored reference signals associated with the non-serving cell fail to satisfy a threshold, wherein the channel quality indicator indicates the failure.

In an eighth aspect, such as in combination with the seventh aspect, process 400 includes removing the non-serving cell from a set of candidate cells of the UE based at least in part on detecting the failure and based at least in part on identifying no selected beam on the non-serving cell.

In a ninth aspect, alone or in combination with one or more of the first through eighth aspects, process 400 includes receiving an uplink resource allocation based at least in part on the channel quality indicator indicating a failure associated with the non-serving cell; and providing information associated with the channel quality indicator or the failure associated with the non-serving cell using the resource allocation.

In a tenth aspect, such as in combination with the ninth aspect, the information associated with the channel quality indicator includes a cell identifier or a physical cell identifier associated with the non-serving cell.

In an eleventh aspect, such as in combination with the ninth aspect, the information associated with the channel quality indicator indicates a selected cell or a selected beam on the non-serving cell with a quality value that satisfies a threshold.

In a twelfth aspect, such as in combination with the eleventh aspect, process 400 includes receiving information configuring the UE to perform a monitoring operation on the selected beam on the non-serving cell.

In a thirteenth aspect, such as in combination with the eleventh aspect, process 400 includes adding the selected cell to a set of candidate cells of the UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
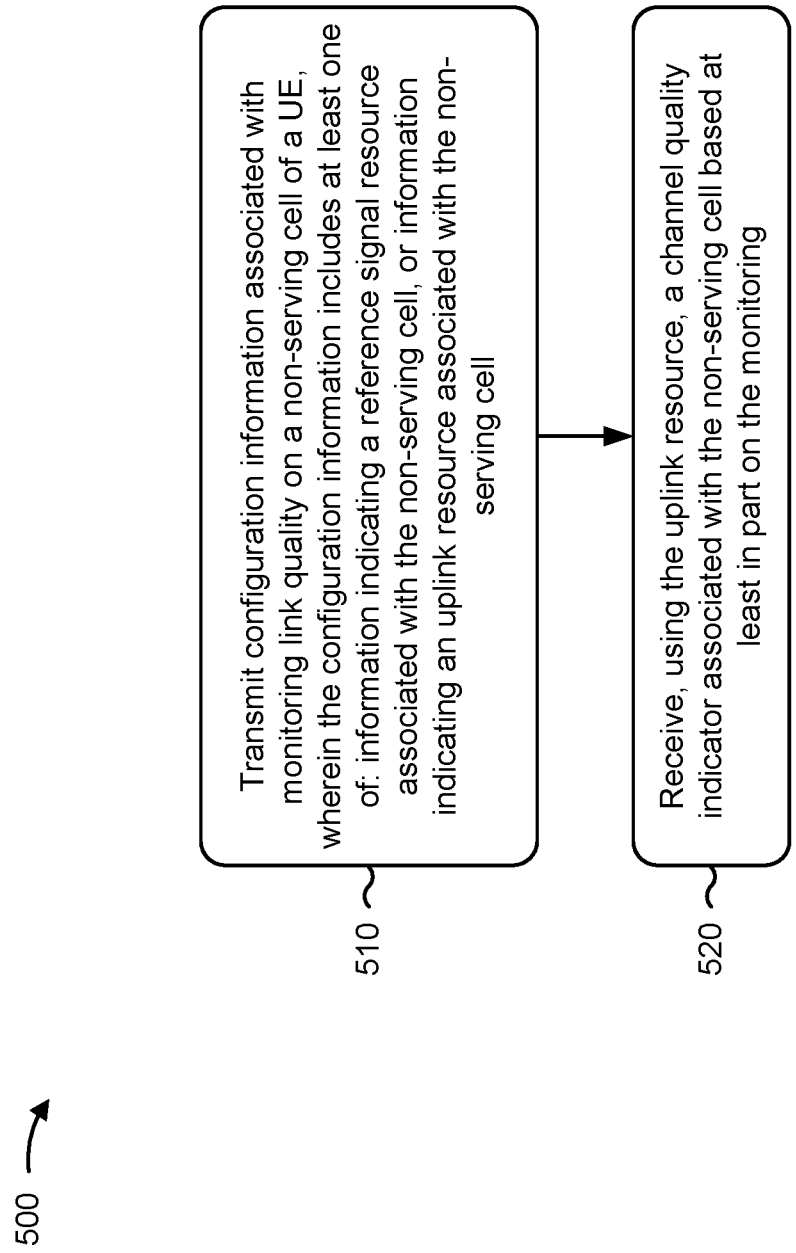
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., BS 110 and/or the like) performs operations associated with radio link monitoring or beam failure detection on a non-serving cell.

As shown in FIG. 5, in some aspects, process 500 may include transmitting configuration information associated with monitoring link quality on a non-serving cell of a UE, wherein the configuration information includes at least one of: information indicating a reference signal resource associated with the non-serving cell, or information indicating an uplink resource associated with the non-serving cell (block 510). For example, the base station (e.g., using controller/processor 240, transmit processor 220, TX MIMO processor 230, MOD 232, antenna 234, and/or the like) may transmit configuration information associated with monitoring link quality on a non-serving cell of a UE, as described above. In some aspects, the configuration information includes at least one of information indicating a reference signal resource associated with the non-serving cell, or information indicating an uplink resource associated with the non-serving cell.

As further shown in FIG. 5, in some aspects, process 500 may include receiving, using the uplink resource, a channel quality indicator associated with the non-serving cell based at least in part on the monitoring (block 520). For example, the base station (e.g., using antenna 234, DEMOD 232, MIMO detector 236, receive processor 238, controller/processor 240, and/or the like) may receive, using the uplink resource, a channel quality indicator associated with the non-serving cell based at least in part on the monitoring, as described above.

Process 500 may include additional aspects, such as any single aspect or any combination of aspects described below and/or in connection with one or more other processes described elsewhere herein.

In a first aspect, the monitoring is associated with a beam failure detection or beam failure recovery operation.

In a second aspect, alone or in combination with the first aspect, the monitoring is associated with a radio link monitoring operation.

In a third aspect, alone or in combination with one or more of the first and second aspects, the non-serving cell comprises at least one of a neighbor cell or a candidate cell of the UE.

In a fourth aspect, alone or in combination with one or more of the first through third aspects, the information indicating the reference signal resource indicates a physical cell identifier of the non-serving cell.

In a fifth aspect, alone or in combination with one or more of the first through fourth aspects, the reference signal resource is associated with at least one of a synchronization signal block or a channel state information reference signal for cell quality monitoring or beam quality monitoring on the non-serving cell.

In a sixth aspect, alone or in combination with one or more of the first through fifth aspects, the uplink resource includes at least one of a physical uplink control channel or a random access channel resource configured in the uplink of a cell provided by the base station.

In a seventh aspect, alone or in combination with one or more of the first through sixth aspects, the channel quality indicator indicates a failure of the non-serving cell detected by the UE.

In an eighth aspect, such as in combination with the seventh aspect, process 500 includes removing the non-serving cell from a set of candidate cells of the UE based at least in part on the failure and based at least in part on the UE identifying no selected beam on the non-serving cell.

In a ninth aspect, alone or in combination with one or more of the first through eighth aspects, process 500 includes transmitting an uplink resource allocation based at least in part on the channel quality indicator indicating a failure of the non-serving cell detected by the UE; and receiving information associated with the channel quality indicator using the resource allocation.

In a tenth aspect, such as in combination with the ninth aspect, the information associated with the channel quality indicator includes a cell identifier or a physical cell identifier associated with the non-serving cell.

In an eleventh aspect, such as in combination with the ninth aspect, the information associated with the channel quality indicator indicates a selected cell or a selected beam on the non-serving cell with a quality value that satisfies a threshold.

In a twelfth aspect, such as in combination with the eleventh aspect, process 500 includes transmitting information configuring the UE to perform a monitoring operation on the selected beam on the non-serving cell.

In a thirteenth aspect, such as in combination with the eleventh aspect, process 500 includes adding the selected cell to a set of candidate cells of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
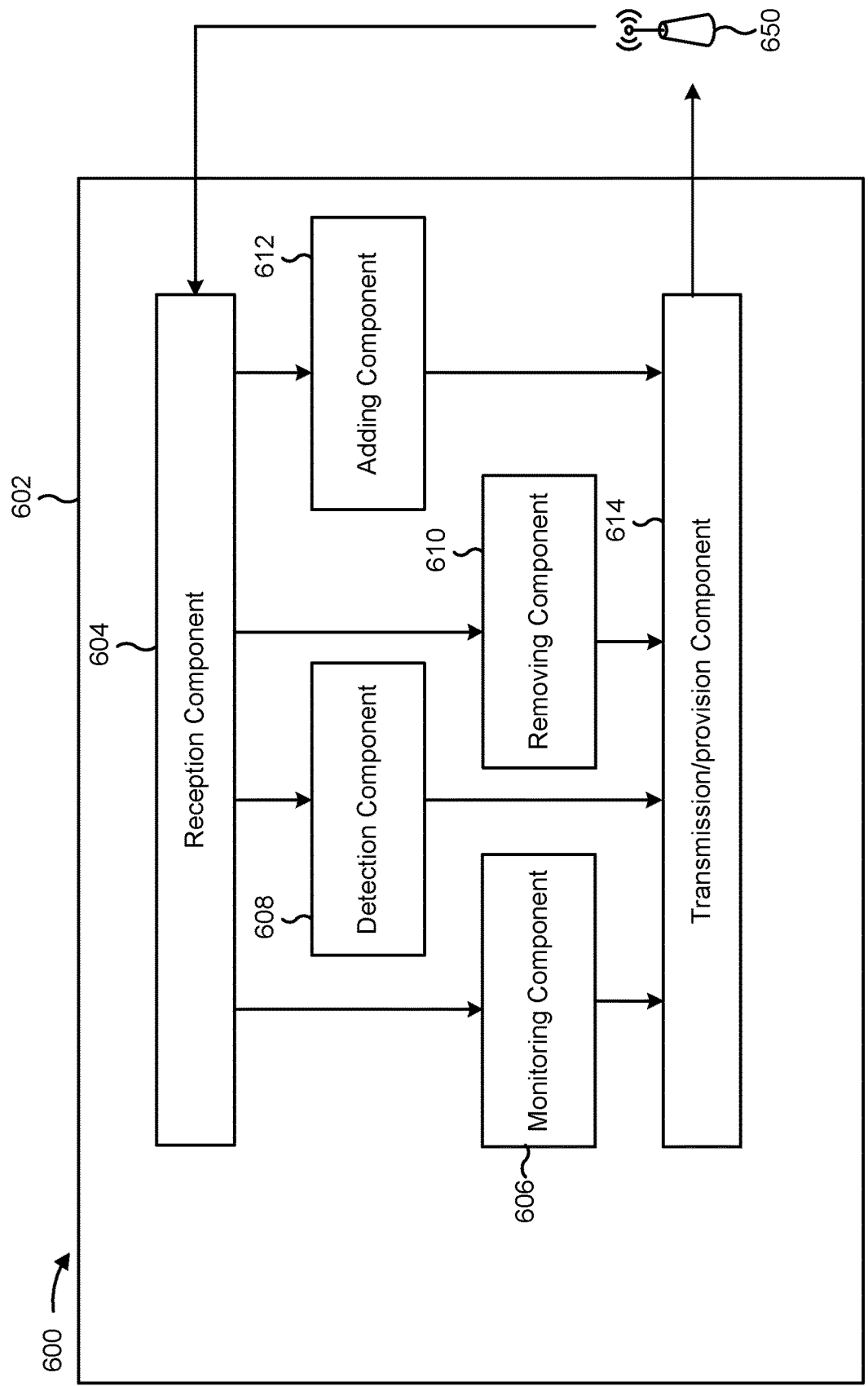
FIG. 6 is a diagram illustrating data flow between different components in an example apparatus, in accordance with various aspects of the present disclosure.

FIG. 6 is a diagram 600 illustrating data flow between different components in an example apparatus 602. The apparatus 602 may be a UE (e.g., UE 120). In some aspects, the apparatus 602 includes a reception component 604, a monitoring component 606, a detection component 608, a removing component 610, an adding component 612, and/or a transmission/provision component 614.

The reception component 604 may be implemented using antenna 252, DEMOD 254, MIMO detector 256, receive processor 258, controller/processor 280, and/or the like. The reception component 604 may receive (e.g., from apparatus 650) configuration information associated with monitoring link quality on a non-serving cell of the apparatus 602. The reception component 604 may receive (e.g., from apparatus 650) reference signals. The reception component 604 may receive (e.g., from apparatus 650) an uplink resource allocation based at least in part on a channel quality indicator indicating a failure associated with the non-serving cell.

The monitoring component 606 may be implemented using antenna 252, DEMOD 254, MIMO detector 256, receive processor 258, controller/processor 280, and/or the like. The monitoring component 606 may monitor a reference signal of the non-serving cell based at least in part on the configuration information.

The detection component 608 may be implemented using antenna 252, DEMOD 254, MIMO detector 256, receive processor 258, controller/processor 280, and/or the like. The detection component 608 may detect a failure on the non-serving cell based at least in part on detecting that a measurement of a set of reference signals, including the reference signal, fails to satisfy a threshold, wherein the channel quality indicator indicates the failure.

The removing component 610 may be implemented using antenna 252, DEMOD 254, MIMO detector 256, receive processor 258, controller/processor 280, and/or the like. The removing component 610 may remove the non-serving cell from a set of candidate cells of the UE based at least in part on detecting the failure and based at least in part on identifying no selected beam on the non-serving cell.

The adding component 612 may be implemented using antenna 252, DEMOD 254, MIMO detector 256, receive processor 258, controller/processor 280, and/or the like. The adding component 612 may add the selected cell to a set of candidate cells of the UE.

The transmission/provision component 614 may be implemented using controller/processor 280, transmit processor 264, TX MIMO processor 266, MOD 254, antenna 252, and/or the like. The transmission/provision component 614 may transmit, to a serving cell using the uplink resource, a channel quality indicator associated with the non-serving cell based at least in part on the monitoring. The transmission/provision component 614 may provide information associated with the channel quality indicator or the failure associated with the non-serving cell using the resource allocation.

The apparatus may include additional components that perform each of the blocks of the algorithm in the aforementioned process 400 of FIG. 4 and/or the like. Each block in the aforementioned process 400 of FIG. 4 and/or the like may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
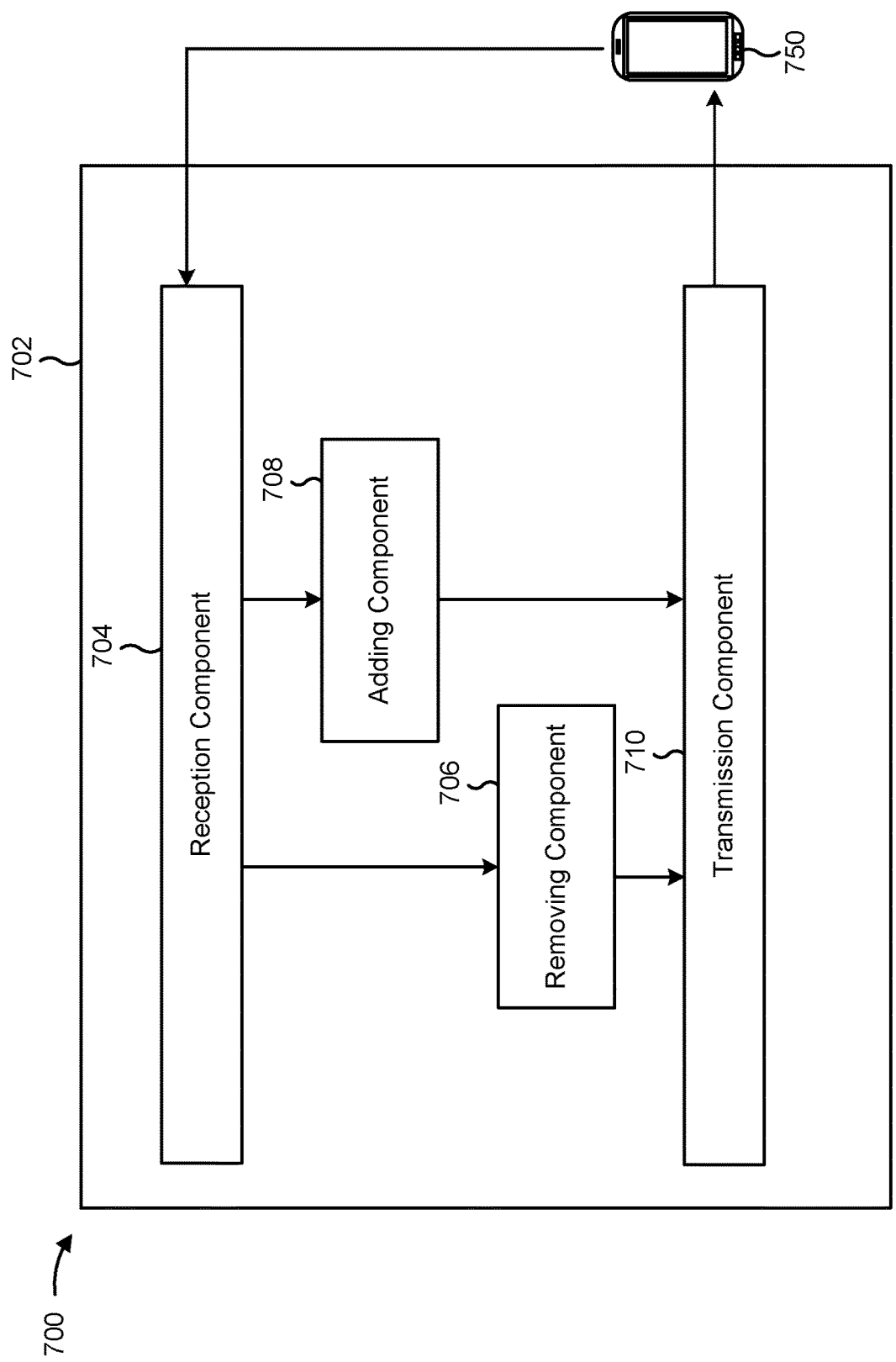
FIG. 7 is a diagram illustrating data flow between different components in an example apparatus, in accordance with various aspects of the present disclosure.

FIG. 7 is a diagram 700 illustrating data flow between different components in an example apparatus 702. The apparatus 702 may be a base station (e.g., base station 110). In some aspects, the apparatus 702 includes a reception component 704, a removing component 706, an adding component 708, and/or a transmission component 710.

The reception component 704 may be implemented using antenna 234, DEMOD 232, MIMO detector 236, receive processor 238, controller/processor 240, and/or the like. The reception component 704 may receive (e.g., from apparatus 750), using an uplink resource, a channel quality indicator associated with a non-serving cell based at least in part on monitoring. The reception component 704 may receive (e.g., from apparatus 750) information associated with the channel quality indicator using an uplink resource allocation.

The removing component 706 may be implemented using controller/processor 240, transmit processor 220, TX MIMO processor 230, MOD 232, antenna 234, and/or the like. The removing component 706 may remove the non-serving cell from a set of candidate cells of a UE (e.g., apparatus 750) based at least in part on a failure and based at least in part on the UE identifying no selected beam on the non-serving cell.

The adding component 708 may be implemented using controller/processor 240, transmit processor 220, TX MIMO processor 230, MOD 232, antenna 234, and/or the like. The adding component 708 may add the selected cell to a set of candidate cells of the UE. In some aspects, the removing component 706 and the adding component 708 may be the same component. In some aspects, the removing component 706 and the adding component 708 may be different components.

The transmission component 710 may be implemented using controller/processor 240, transmit processor 220, TX MIMO processor 230, MOD 232, antenna 234, and/or the like. The transmission component 710 may transmit configuration information associated with monitoring link quality on a non-serving cell of a UE (e.g., apparatus 750). The transmission component 710 may transmit an uplink resource allocation based at least in part on the channel quality indicator indicating a failure of the non-serving cell detected by the UE.

The apparatus may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The following provides an overview of aspects of the present disclosure:

Aspect 1: A method of wireless communication performed by a user equipment (UE), comprising: receiving configuration information associated with monitoring link quality on a non-serving cell of the UE, wherein the configuration information includes at least one of: information indicating a reference signal resource associated with the non-serving cell, or information indicating an uplink resource associated with the non-serving cell; monitoring a reference signal of the non-serving cell based at least in part on the configuration information; and transmitting, to a serving cell using the uplink resource, a channel quality indicator associated with the non-serving cell based at least in part on the monitoring.

Aspect 2: The method of aspect 1, wherein the monitoring is associated with a beam failure detection or beam failure recovery operation.

Aspect 3: The method of any of aspects 1-2, wherein the monitoring is associated with a radio link monitoring operation.

Aspect 4: The method of any of aspects 1-3, wherein the non-serving cell comprises at least one of a neighbor cell or a candidate cell of the UE.

Aspect 5: The method of any of aspects 1-4, wherein the information indicating the reference signal resource indicates a physical cell identifier of the non-serving cell.

Aspect 6: The method of any of aspects 1-5, wherein the reference signal comprises at least one of a synchronization signal block or a channel state information reference signal for cell quality monitoring or beam quality monitoring on the non-serving cell.

Aspect 7: The method of any of aspects 1-6, wherein the uplink resource includes at least one of a physical uplink control channel or a random access channel (RACH) resource configured in the uplink of a cell.

Aspect 8: The method of any of aspects 1-7, further comprising: detecting a failure on the non-serving cell based at least in part on detecting that all monitored reference signals associated with the non-serving cell fail to satisfy a threshold, wherein the channel quality indicator indicates the failure.

Aspect 9: The method of aspect 8, further comprising: removing the non-serving cell from a set of candidate cells of the UE based at least in part on detecting the failure and based at least in part on identifying no selected beam on the non-serving cell.

Aspect 10: The method of any of aspects 1-9, further comprising: receiving an uplink resource allocation based at least in part on the channel quality indicator indicating a failure associated with the non-serving cell; and providing information associated with the channel quality indicator or the failure associated with the non-serving cell using the resource allocation.

Aspect 11: The method of aspect 10, wherein the information associated with the channel quality indicator includes a cell identifier or a physical cell identifier associated with the non-serving cell.

Aspect 12: The method of aspect 10, wherein the information associated with the channel quality indicator indicates a selected cell or a selected beam on the non-serving cell with a quality value that satisfies a threshold.

Aspect 13: The method of aspect 12, further comprising: receiving information configuring the UE to perform a monitoring operation on the selected beam on the non-serving cell.

Aspect 14: The method of aspect 12, further comprising: adding the selected cell to a set of candidate cells of the UE.

Aspect 15: A method of wireless communication performed by a base station, comprising: transmitting configuration information associated with monitoring link quality on a non-serving cell of a user equipment (UE), wherein the configuration information includes at least one of: information indicating a reference signal resource associated with the non-serving cell, or information indicating an uplink resource associated with the non-serving cell; and receiving, using the uplink resource, a channel quality indicator associated with the non-serving cell based at least in part on the monitoring.

Aspect 16: The method of aspect 15, wherein the monitoring is associated with a beam failure detection or beam failure recovery operation.

Aspect 17: The method of any of aspects 15-16, wherein the monitoring is associated with a radio link monitoring operation.

Aspect 18: The method of any of aspects 15-17, wherein the non-serving cell comprises at least one of a neighbor cell or a candidate cell of the UE.

Aspect 19: The method of any of aspects 15-18, wherein the information indicating the reference signal resource indicates a physical cell identifier of the non-serving cell.

Aspect 20: The method of any of aspects 15-19, wherein the reference signal resource is associated with at least one of a synchronization signal block or a channel state information reference signal for cell quality monitoring or beam quality monitoring on the non-serving cell.

Aspect 21: The method of any of aspects 15-20, wherein the uplink resource includes at least one of a physical uplink control channel or a random access channel (RACH) resource configured in the uplink of a cell provided by the base station.

Aspect 22: The method of any of aspects 15-21, wherein the channel quality indicator indicates a failure of the non-serving cell detected by the UE.

Aspect 23: The method of aspect 22, further comprising: removing the non-serving cell from a set of candidate cells of the UE based at least in part on the failure and based at least in part on the UE identifying no selected beam on the non-serving cell.

Aspect 24: The method of any of aspects 15-23, further comprising: transmitting an uplink resource allocation based at least in part on the channel quality indicator indicating a failure of the non-serving cell detected by the UE; and receiving information associated with the channel quality indicator using the resource allocation.

Aspect 25: The method of aspect 24, wherein the information associated with the channel quality indicator includes a cell identifier or a physical cell identifier associated with the non-serving cell.

Aspect 26: The method of aspect 24, wherein the information associated with the channel quality indicator indicates a selected cell or a selected beam on the non-serving cell with a quality value that satisfies a threshold.

Aspect 27: The method of aspect 26, further comprising: transmitting information configuring the UE to perform a monitoring operation on the selected beam on the non-serving cell.

Aspect 28: The method of aspect 26, further comprising: adding the selected cell to a set of candidate cells of the UE.

Aspect 29: An apparatus of a device for wireless communication, comprising a memory and one or more processors coupled to the memory, the memory and the one or more processors configured to perform the method of one or more of aspects 1-28.

Aspect 30: An apparatus for wireless communication, comprising at least one means for performing the method of one or more of aspects 1-28.

Aspect 31: A non-transitory computer-readable medium storing a set of instructions for wireless communication, the set of instructions comprising one or more instructions that, when executed by one or more processors of a device, cause the device to perform the method of one or more of aspects 1-28.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving configuration information associated with monitoring link quality on a non-serving cell of the UE, wherein the configuration information includes at least one of:
      information indicating a reference signal resource associated with the non-serving cell, or
      information indicating an uplink resource associated with the non-serving cell;
   monitoring, in association with a beam failure detection for the non-serving cell, a reference signal of the non-serving cell based at least in part on the configuration information; and
   transmitting, to a serving cell using the uplink resource, a channel quality indicator associated with the non-serving cell based at least in part on the monitoring.

2. The method of claim 1, wherein the monitoring is associated with a beam failure recovery operation.

3. The method of claim 1, wherein the monitoring is associated with a radio link monitoring operation.

4. The method of claim 1, wherein the non-serving cell comprises at least one of a neighbor cell or a candidate cell of the UE.

5. The method of claim 1, wherein the information indicating the reference signal resource indicates a physical cell identifier of the non-serving cell.

6. The method of claim 1, wherein the reference signal comprises at least one of a synchronization signal block or a channel state information reference signal for cell quality monitoring or beam quality monitoring on the non-serving cell.

7. The method of claim 1, wherein the uplink resource includes at least one of a physical uplink control channel or a random access channel (RACH) resource configured in the uplink of a cell.

8. The method of claim 1, further comprising:
detecting a failure on the non-serving cell based at least in part on detecting that all monitored reference signals associated with the non-serving cell fail to satisfy a threshold, wherein the channel quality indicator indicates the failure.

9. The method of claim 8, further comprising:
removing the non-serving cell from a set of candidate cells of the UE based at least in part on detecting the failure and based at least in part on identifying no selected beam on the non-serving cell.

10. The method of claim 1, further comprising:
receiving an uplink resource allocation based at least in part on the channel quality indicator indicating a failure associated with the non-serving cell; and
providing information associated with the channel quality indicator or the failure associated with the non-serving cell using the uplink resource allocation.

11. The method of claim 10, wherein the information associated with the channel quality indicator includes a cell identifier or a physical cell identifier associated with the non-serving cell.

12. The method of claim 10, wherein the information associated with the channel quality indicator indicates a selected cell or a selected beam on the non-serving cell with a quality value that satisfies a threshold.

13. The method of claim 12, further comprising:
receiving information configuring the UE to perform a monitoring operation on the selected beam on the non-serving cell.

14. The method of claim 12, further comprising:
adding the selected cell to a set of candidate cells of the UE.

15. A method of wireless communication performed by a base station, comprising:
transmitting configuration information associated with monitoring link quality on a non-serving cell of a user equipment (UE), the monitoring being associated with a beam failure detection for the non-serving cell, wherein the configuration information includes at least one of:
information indicating a reference signal resource associated with the non-serving cell, or
information indicating an uplink resource associated with the non-serving cell; and
receiving, using the uplink resource, a channel quality indicator associated with the non-serving cell based at least in part on the monitoring.

16. The method of claim 15, wherein the monitoring is associated with a or beam failure recovery operation.

17. The method of claim 15, wherein the monitoring is associated with a radio link monitoring operation.

18. The method of claim 15, wherein the non-serving cell comprises at least one of a neighbor cell or a candidate cell of the UE.

19. The method of claim 15, wherein the information indicating the reference signal resource indicates a physical cell identifier of the non-serving cell.

20. The method of claim 15, wherein the reference signal resource is associated with at least one of a synchronization signal block or a channel state information reference signal for cell quality monitoring or beam quality monitoring on the non-serving cell.

21. The method of claim 15, wherein the uplink resource includes at least one of a physical uplink control channel or a random access channel (RACH) resource configured in the uplink of a cell provided by the base station.

22. The method of claim 15, wherein the channel quality indicator indicates a failure of the non-serving cell detected by the UE.

23. The method of claim 22, further comprising:
removing the non-serving cell from a set of candidate cells of the UE based at least in part on the failure and based at least in part on the UE identifying no selected beam on the non-serving cell.

24. The method of claim 15, further comprising:
transmitting an uplink resource allocation based at least in part on the channel quality indicator indicating a failure of the non-serving cell detected by the UE; and
receiving information associated with the channel quality indicator using the uplink resource allocation.

25. The method of claim 24, wherein the information associated with the channel quality indicator includes a cell identifier or a physical cell identifier associated with the non-serving cell.

26. The method of claim 24, wherein the information associated with the channel quality indicator indicates a selected cell or a selected beam on the non-serving cell with a quality value that satisfies a threshold.

27. The method of claim 26, further comprising:
transmitting information configuring the UE to perform a monitoring operation on the selected beam on the non-serving cell.

28. The method of claim 26, further comprising:
adding the selected cell to a set of candidate cells of the UE.

29. A user equipment (UE) for wireless communication, comprising:
a memory; and
one or more processors coupled to the memory, the one or more processors configured to:
receive configuration information associated with monitoring link quality on a non-serving cell of the UE, wherein the configuration information includes at least one of:
information indicating a reference signal resource associated with the non-serving cell, or
information indicating an uplink resource associated with the non-serving cell;
monitor, in association with a beam failure detection for the non-serving cell, a reference signal of the non-serving cell based at least in part on the configuration information; and
transmit, to a serving cell using the uplink resource, a channel quality indicator associated with the non-serving cell based at least in part on the monitoring.

30. A base station for wireless communication, comprising:
a memory; and
one or more processors coupled to the memory, the one or more processors configured to:
transmit configuration information associated with monitoring link quality on a non-serving cell of a user equipment (UE), the monitoring being associated with a beam failure detection operation for the non-serving cell, wherein the configuration information includes at least one of:
information indicating a reference signal resource associated with the non-serving cell, or
information indicating an uplink resource associated with the non-serving cell; and receive, using the uplink resource, a channel quality indicator associated with the non-serving cell based at least in part on the monitoring.

\* \* \* \* \*